Oct. 18, 1955  C. A. WALDSMITH  2,721,049
TILTABLE SUPPORT
Filed May 28, 1953
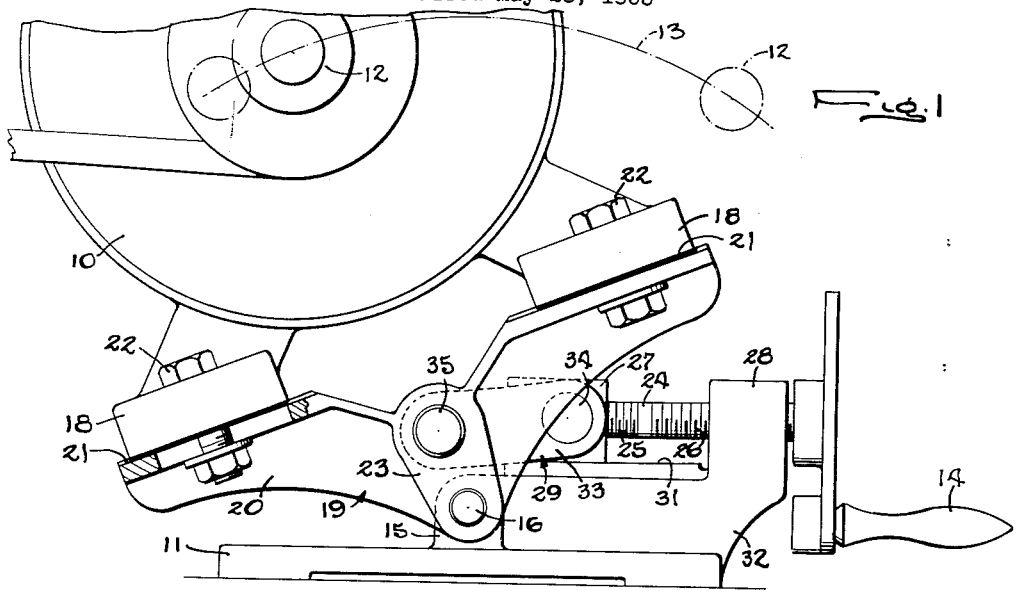
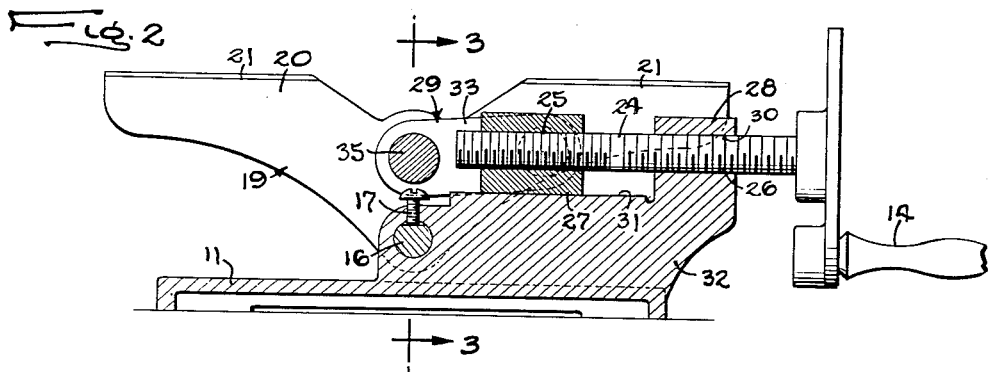
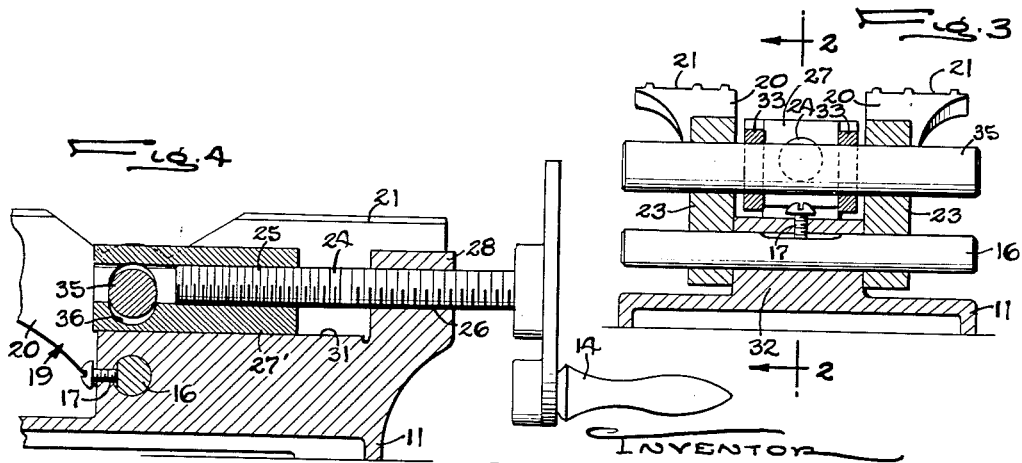
INVENTOR
Cecil A. Waldsmith
By Carlson, Pitzner, Hubbard & Wolfe
ATTORNEY

United States Patent Office 2,721,049
Patented Oct. 18, 1955

2,721,049

TILTABLE SUPPORT

Cecil A. Waldsmith, Rockford, Ill., assignor to Lovejoy Flexible Coupling Co., Chicago, Ill., a corporation of Illinois Application May 28, 1953, Serial No. 358,090

6 Claims. (Cl. 248—23)

This invention relates to supports for electric motors and the like in which the inclination of the supporting surface is varied by turning a differential screw to tilt the support on its base. More particularly, the invention has reference to a support in which two nuts are threaded on the opposite end portions of the screw and connected respectively to the base and the support.

The general object is to provide a new and improved support which is simple in construction, inexpensive to manufacture and rugged in service use and which, at the same time, enables a fine adjustment of the angular position of the supporting surface.

A more detailed object is to arrange the nuts so that one is stationary while the other moves along a straight line when the screw is turned and to connect the movable nut to the support in a manner to change the linear movement of the latter nut into tilting of the support.

Other objects and advantages of the invention will become apparent from the following detailed description taken in connection with the accompanying drawings, in which Figure 1 is a fragmentary side elevational view showing an electric motor mounted on a tiltable support embodying the novel features of the present invention, parts of the support being broken away and shown in section.

Fig. 2 is a longitudinal sectional view taken along the line 2—2 in Fig. 3.

Fig. 3 is a sectional view taken along the line 3—3 in Fig. 2.

Fig. 4 is a fragmentary longitudinal section of a modified form of the invention.

As shown in the drawings for purposes of illustration, the improved support is especially useful in mounting an electric motor 10 on a base 11 for tilting of the motor shaft 12 back and forth in an arc 13 by turning a hand crank 14 in opposite directions. The base is generally rectangular and is formed with a flat bottom surface and a lug 15 rigid with and upstanding from the base center. A pin 16 extends through a transverse hole in the lug and is held against longitudinal shifting by a set screw 17 projecting into a circumferential slot in the pin.

The pin 16 defines the axis of tilting of the motor whose base 18 is secured to a supporting member 19 pivotally mounted intermediate its ends on the pin. Herein, the member 19 comprises two rigid bars 20 having at opposite ends flattened upper surfaces 21 against which the four corners of the motor base 18 may be clamped by bolts 22. Rigid with and depending from each bar midway between its ends is an arm 23 whose lower end is apertured to receive one end of the pivot pin 16 so that the bars may be swung about the axis of the pin.

To swing the support 19 about the axis of the pin 16 upon turning of the hand crank 14, the latter is fast on a shaft 24 which, when rotated, tilts the support. For this purpose, the shaft is spaced above and extends at right angles to the pin and threads 25 and 26 are cut on the opposite end portions of the shaft and are connected to the support and the base respectively. The threads extend helically around the shaft in the same direction but are of different pitches, the thread 26 on the outer end portion of the shaft being coarser than the thread 25 in this case.

In order to connect the shaft 24 to the support 19 and the base 11, two nuts 27 and 28 are threaded respectively on the inner and outer end portions of the shaft and the nut 28 is mounted on the base while the nut 27 is connected to the support and is held against turning to move relative to the shaft when the latter is rotated. With this arrangement, the shaft when turned advances in one direction through the nut 28 while the nut 27 moves in the opposite direction relative to the shaft. Due to the difference in pitch of the threads 25 and 26, the advance of the nut 27 is less than that of the shaft with the result that the nut actually moves in the same direction as but at a slower rate than the shaft. In this way, a fine adjustment of the nut 27 and hence of the angular position of the support 19 may be obtained even though the threads 25 and 26 are comparatively coarse.

In accordance with the present invention, the nuts 27 and 28 are connected to the base 11 and the supporting member 19 in a novel manner to provide a rugged but inexpensive support. For this purpose, the nut 28 is stationary and rigid with the base while the nut 27 is lineally shiftable relative to the base and is joined to the support 19 by a connection 29 which changes such shifting into tilting of the support. In other words, the axis of the shaft 24 is fixed and the nut 27 is moved back and forth along this axis to change the angular position of the support. Preferably, the stationary nut 28 is made integrally with the base and, in the present instance, is a lug upstanding from one end of the base. The axis of the threaded bore 30 formed in the lug is parallel to the bottom of the base so that the shaft is disposed horizontally.

To support the movable nut 27 for endwise shifting, the nut may slide on a flat horizontal guide surface 31 on the base 11. The surface extends along and is disposed under the shaft 24 and may, as shown, be formed on the upper side of a web 32 on the base between the lugs 15 and 28. As illustrated in Fig. 3, the nut is square in cross section so as to present a flat under side sliding on the guide surface and holding the nut against turning relative to the base.

In order that the support 19 swings about the axis of the pin 16 upon sliding of the movable nut 27, the latter is pivotally joined to the support through the connection 29 which changes the linear motion of the nut to angular movement of the support. To this end, the connection may, as shown in Figs. 1, 2 and 3, comprise one or more links 33 pivotally connected at one end to the sliding nut and at the other end to the support above the pin 16. In the illustrated embodiment, two links straddling the nut are used, the adjacent ends of the links being journaled on short pins 34 (Fig. 1) projecting from opposite sides of the nut. At their other ends, the links project in between the arms 23 of the bars 20 and are journaled on a horizontal pin 35 mounted on the support 19 above and parallel to the pivot pin 16. Preferably, the center of the pin 35 is below the centers of the pins 34 in any position of the support so that the links 33 always are inclined downwardly from the nut 27 to the support and thus tend to hold the nut down on the guide surface 31. The links also serve to hold the movable nut against turning.

Instead of the links 33, the connection 29 may be in the form of a pin and slot as shown in Fig. 4. For this purpose, the nut 27' is elongated so that its inner end portion is disposed midway between the ends of the support bars 20. A slot 36 elongated in the vertical direction is formed in the inner end portion of the nut 27' and the upper pin 35 on the support 19 extends through this slot. The latter is substantially as wide as the diameter of the pin 35 but is somewhat longer as shown in Fig. 4 so that the pin moves back and forth with the nut but is free to move up and down relative to the nut as the support swings in one direction or the other.

By employing a sliding nut 27 and a simple pivotal connection 29, the construction of the support is rugged in use but inexpensive to manufacture. At the same time, the arrangement incorporates a differential screw 24 which permits a fine adjustment of the angular position of the supporting member 19 to be obtained.

I claim as my invention:

1. A tilting support comprising a base, a supporting member pivotally mounted on said base to swing about a first axis extending across the base, said base having a bore whose axis extends transversely of said first axis, a screw shaft having threads of different pitch formed along opposite end portions thereof, one of said end portions being threaded into said bore, means on said base providing a straight guide surface paralleling the axis of said bore and disposed alongside the other end portion of said shaft, a nut threaded on said other end portion and held against turning to slide back and forth on said surface upon turning of said shaft, an element mounted on said supporting member and disposed laterally of said first axis, and a connection between said element and said second nut including a pivot and operable upon sliding of said second nut to swing said supporting member about said second axis.

2. A tilting support comprising a base, a supporting member pivotally mounted on said base to swing about an axis extending across the base, a screw shaft having a fixed axis extending transversely of said axis, threads of different pitch formed along opposite end portions of said shaft, a stationary nut threaded on one end portion of said shaft and rigidly mounted on said base, a second nut threaded on the other end portion of said shaft, a guide on said base holding said second nut against turning whereby the nut is shifted lineally upon turning of the shaft, an element mounted on said supporting member and disposed laterally of said axis, and a connection between said second nut and said element including a pivot and operable upon shifting of said second nut to swing said supporting member about said axis.

3. In a tilting support, the combination of, a base, a supporting member pivoted on said base to swing about a first predetermined axis, a stationary nut rigidly mounted on said base and having a fixed axis extending transversely of said first axis, a shaft extending along said fixed axis and having threads of different pitch formed on opposite end portions thereof, one of said end portions being threaded into said nut, a movable nut threaded on the other end portion of said shaft, means holding said movable nut against turning thereby to cause the nut to move axially and along a straight line when said shaft is turned, an element mounted on said supporting member and disposed laterally of said first axis, and a connection between said second nut and said element including a pivot and operable upon shifting of said second nut to swing said supporting member about said first axis.

4. A tilting support having, in combination, a base, a supporting member pivotally mounted on said base to swing about a first horizontal axis, said base having a bore with a horizontal axis spaced above said first axis, a shaft having threads of different pitch formed along opposite end portions thereof, one of said end portions being threaded into said bore, a straight flat guide surface on said base paralleling the axis of said bore and disposed beneath the other end portion of said shaft, a nut threaded on said other end portion and having a flat side resting on said guide surface thereby to slide back and forth on said surface upon turning of the shaft, a first pivot on said nut, a second pivot mounted on said supporting member and disposed below said first pivot in all angular positions of the member, and a rigid link connecting said pivots thereby to tilt said member upon sliding of said nut while holding the nut down on said surface.

5. A tilting support comprising a base, a supporting member journaled on said base to swing about an axis extending across said base, a shaft extending transversely of said axis, threads of different pitch formed along opposite end portions of said shaft, a stationary nut threaded on one end portion of said shaft and rigidly mounted on said base, a movable nut threaded on the other end portion of said shaft for endwise shifting along said shaft, means for holding said movable nut against turning relative to said shaft, a first pivot mounted on said movable nut, a second pivot mounted on said support and spaced laterally of said axis, and a rigid link joining said two pivots and operable to tilt said support in response to endwise shifting of said movable nut.

6. In a tilting support, the combination of, a base, a supporting member pivoted on said base to swing about a first predetermined axis, a stationary nut rigidly mounted on said base and having a fixed axis extending transversely of said first axis, a shaft extending along said fixed axis and having threads of different pitch formed on opposite end portions, one of said end portions being threaded into said nut, a movable nut threaded on the other end portion of said shaft, means holding said movable nut against turning thereby to cause the nut to move axially and along a straight line when said shaft is turned, and a pin and slot connection joining said movable nut and said supporting member and operable to change linear movement of the nut to swinging of the member, the pin of said connection being spaced laterally of said first axis.

References Cited in the file of this patent

UNITED STATES PATENTS

| | | |
|---|---|---|
| 1,808,497 | Dina | June 2, 1931 |
| 2,395,625 | Heyer | Feb. 26, 1946 |
| 2,662,708 | Schmitt | Dec. 15, 1953 |